(12) United States Patent
Fakoorian et al.

(10) Patent No.: US 10,728,914 B2
(45) Date of Patent: Jul. 28, 2020

(54) PHYSICAL UPLINK CONTROL CHANEL (PUCCH) CONFIGURATION FOR MACHINE TYPE COMMUNICATIONS (MTC)

(71) Applicant: QUALCOMM Incorporated, San Diego, CA (US)

(72) Inventors: Seyed Ali Akbar Fakoorian, San Diego, CA (US); Alberto Rico Alvarino, San Diego, CA (US); Wanshi Chen, San Diego, CA (US); Michael Mao Wang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/149,565

(22) Filed: May 9, 2016

(65) Prior Publication Data

US 2016/0338088 A1 Nov. 17, 2016

Related U.S. Application Data

(60) Provisional application No. 62/162,610, filed on May 15, 2015.

(51) Int. Cl.
*H04W 72/12* (2009.01)
*H04B 1/713* (2011.01)
(Continued)

(52) U.S. Cl.
CPC ........ *H04W 72/1263* (2013.01); *H04B 1/713* (2013.01); *H04L 5/0053* (2013.01);
(Continued)

(58) Field of Classification Search
CPC ......... H04W 72/1263; H04W 72/0413; H04W 72/042; H04W 16/32; H04W 4/005; H04W 88/12; H04B 1/713
See application file for complete search history.

(56) References Cited

U.S. PATENT DOCUMENTS

2009/0196240 A1* 8/2009 Frederiksen .......... H04L 1/1607
370/329
2012/0327894 A1* 12/2012 Axmon ................. H04W 48/12
370/330
(Continued)

FOREIGN PATENT DOCUMENTS

| CN | 101242662 A | 8/2008 |
| CN | 101860912 A | 10/2010 |
| CN | 102958133 A | 3/2013 |

OTHER PUBLICATIONS

Alcatel-Lucent., et al., "Considerations for PUCCH and PHICH for LC-MTC", 3GPP Draft; R1-150129-REL-13 MTC-PUCCH & PHICH V02, 3$^{RD}$ Generation Partnership Project (3GPP), Mobile Competence Centre ; 650, Route Des Lucioles ; F-06921 Sophia-Antipolis Cedex; France val. RAN WG1, No. Athens, Greece; Feb. 9, 2015-Feb. 13, 2015, Jan. 30, 2015 (Jan. 30, 2015), XP050948526, 4 pages. Retrieved from the Internet: URL: http://www.3gpp.org/ftp/tsg_ran/WG1_RL1/TSGR1_80/Docs/.
(Continued)

*Primary Examiner* — Jamal Javaid
*Assistant Examiner* — Thad N Defauw
(74) *Attorney, Agent, or Firm* — Patterson & Sheridan, LLP

(57) ABSTRACT

Certain aspects of the present disclosure generally relate to wireless communications, and more specifically to determining uplink narrowband regions based on downlink resources. An example method generally includes identifying one or more uplink narrowband regions within a wider system bandwidth, based on downlink resources, and communicating using at least one of the identified narrowbands.

16 Claims, 9 Drawing Sheets

(51) Int. Cl.

| | |
|---|---|
| *H04W 4/00* | (2018.01) |
| *H04W 72/04* | (2009.01) |
| *H04W 16/32* | (2009.01) |
| *H04L 5/00* | (2006.01) |
| *H04W 4/70* | (2018.01) |
| *H04W 88/12* | (2009.01) |

(52) U.S. Cl.
CPC ............ *H04W 4/70* (2018.02); *H04W 16/32* (2013.01); *H04W 72/042* (2013.01); *H04W 72/0413* (2013.01); *H04W 88/12* (2013.01)

(56) References Cited

U.S. PATENT DOCUMENTS

| | | | | |
|---|---|---|---|---|
| 2013/0094457 | A1* | 4/2013 | Seo | H04W 72/042 370/329 |
| 2013/0201936 | A1 | 8/2013 | Chen et al. | |
| 2013/0322363 | A1* | 12/2013 | Chen | H04W 72/042 370/329 |
| 2014/0328303 | A1* | 11/2014 | Jamadagni | H04W 4/70 370/329 |
| 2016/0127936 | A1* | 5/2016 | Chatterjee | H04B 7/0626 370/252 |
| 2016/0128055 | A1* | 5/2016 | Xiong | H04W 72/048 370/329 |
| 2017/0164335 | A1 | 6/2017 | Yamamoto et al. | |
| 2018/0035424 | A1* | 2/2018 | Sun | H04B 1/713 |

OTHER PUBLICATIONS

Huawei., et al., "Discussion on the scope of MTC work in LTE Rel-13", 3GPP Draft; RP-141279, 3rd Generation Partnership Project (3GPP), Mobile Competence Centre; 650, Route Des Lucioles; F-06921 Sophia-Antipolis Cedex; France val. TSG RAN, No. Edinburgh, Scotland; Sep. 9, 2014-Sep. 12, 2014, Sep. 2, 2014 (Sep. 2, 2014), XP050783636, 6 pages. Retrieved from the Internet: URL: http://www.3gpp.org/ftp/Meetings_3GPP_SYNC/RAN/Docs/.

International Search Report and Written Opinion—PCT/US2016/031555—ISA/EPO—dated Oct. 27, 2016.
Alcatel-Lucent et al., "PUCCH & PHICH for LC-MTC," 3GPP Draft; R1-151231 REL-13 MTC PUCCH V01, 3rd Generation Partnership Project (3GPP), Mobile Competence Centre ; 650, Route Des Lucioles ; F-06921 Sophia-Antipolis Cedex ; France vol. RAN WG1, No. Belgrade, Serbia; Apr. 20, 2015-Apr. 24, 2015 Apr. 19, 2015 (Apr. 19, 2015), XP050934111, Retrieved from the Internet: URL:http://www.3gpp.org/ftp/Meetings_3GPP_SYNC/RAN1/Docs/ [retrieved on Apr. 19, 2015].
Catt: "PUCCH Resource Allocation for TDD eIMTA," 3GPP Draft; R1-135059, 3rd Generation Partnership Project (3GPP), Mobile Competence Centre ; 650, Route Des Lucioles ; P-06921 Sophia-Antipolis Cedex ; France vol. RAN WG1, No. San Francisco, USA; Nov. 11, 2013-Nov. 15, 2013 Nov. 13, 2013 (Nov. 13, 2013), XP050734762, Retrieved from the Internet: URL:http://www.3gpp.org/ftp/Meetings_3GPP_SYNC/RAN/RAN1/Docs/ [retrieved on Nov. 13, 2013] Section 2.1-2.2.
Partial International Search Report—PCT/US2016/031555—ISA/EPO—dated Aug. 5, 2016.
Intel Corporation: "On PUCCH and UCI Transmission for MTC", 3GPP TSG-RAN WG1#80b R1-151431, Apr. 20, 2015, pp. 1-4, URL: http://www.3gpp.org/ftp/tsg_ran/WG1_RL1/TSGR1_80b/Docs/R1-151431.zip.
Mediatek In: "Discussion on PUCCH Transmission for Rel-13 MTC", 3GPP Draft; R1-152115 Discussion on PUCCH Transmission for Rel-13 MTC, 3rd Generation Partnership Project (3GPP), Mobile Competence Centre; 650, Route Des Lucioles; F-06921 Sophia-Antipolis Cedex, vol. RAN WG1, no. Belgrade; 20150420-20150424, Apr. 19, 2015 :(Apr. 19, 2005), XP050934959, 4 Pages, Retrieved from the Internet: URL: http://WWW.3gpp.org/ftp/Meetings/3GPP/ SYNC/RAN1/Docs/ [retrieved on Apr. 19, 2015].
Nec: "Details of the UL Frequency Hopping Scheme for LTE Rel-13 MTC", 3GPP TSG-RAN WG1#80b, R1-152138, Apr. 20, 2015, pp. 1-2, URL: http://www.3gpp.org/ftp/tsg_ran/WG1_RL1/TSGR1_80b/Docs/R1-152138.zip.
Samsung: "Uplink Control Channel Design", 3GPP TSG-RAN WG1#49, R1-072244, May 7, 2007, pp. 1-4, URL:http://www.3gpp.org/ftp/tsg_ran/WG1_RL1/TSGR1_49/Docs/R1-072244.zip.

* cited by examiner

PHYSICAL UPLINK CONTROL CHANEL (PUCCH) CONFIGURATION FOR MACHINE TYPE COMMUNICATIONS (MTC)

CROSS-REFERENCE TO RELATED APPLICATIONS

This application claims benefit of U.S. Provisional Patent Application Ser. No. 62/162,610, entitled "Physical Uplink Control Channel (PUCCH) Configuration for Machine Type Communications (MTC)," filed May 15, 2015 and assigned to the assignee hereof, the contents of which are herein incorporated by reference in its entirety.

BACKGROUND

I. Field

Certain aspects of the present disclosure generally relate to wireless communications, and more specifically to determining uplink narrowband regions based on downlink resources.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, monitors, location tags, drones, trackers, robots, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for determining uplink narrowband regions based on downlink resources.

Certain aspects of the present disclosure provide a method for wireless communications by an apparatus. The method generally includes identifying one or more uplink narrowband regions within a wider system bandwidth, based on downlink resources, and communicating using at least one of the identified narrowbands.

Certain aspects of the present disclosure provide an apparatus for wireless communications. The apparatus generally includes at least one processor configured to identify one or more uplink narrowband regions within a wider system bandwidth, based on downlink resources, and a transceiver configured to communicate using at least one of the identified narrowbands.

Certain aspects of the present disclosure provide an apparatus for wireless communications. The apparatus generally includes means for identifying one or more uplink narrowband regions within a wider system bandwidth, based on downlink resources, and means for communicating using at least one of the identified narrowbands.

Certain aspects of the present disclosure provide a non-transitory computer readable medium for wireless communications. The non-transitory computer readable medium generally includes instructions for identifying one or more uplink narrowband regions within a wider system bandwidth, based on downlink resources, and communicating using at least one of the identified narrow bands.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Machine type communication (MTC) user equipments (UEs) generally are low cost, low data rate UEs that may have limited communications capabilities (e.g., a reduced number of receive chains) relative to non-MTC UEs. Aspects of the present disclosure provide techniques and apparatus for enhancing downlink coverage for low cost, low data rate UEs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

An Example Wireless Communications System

Figure 1:
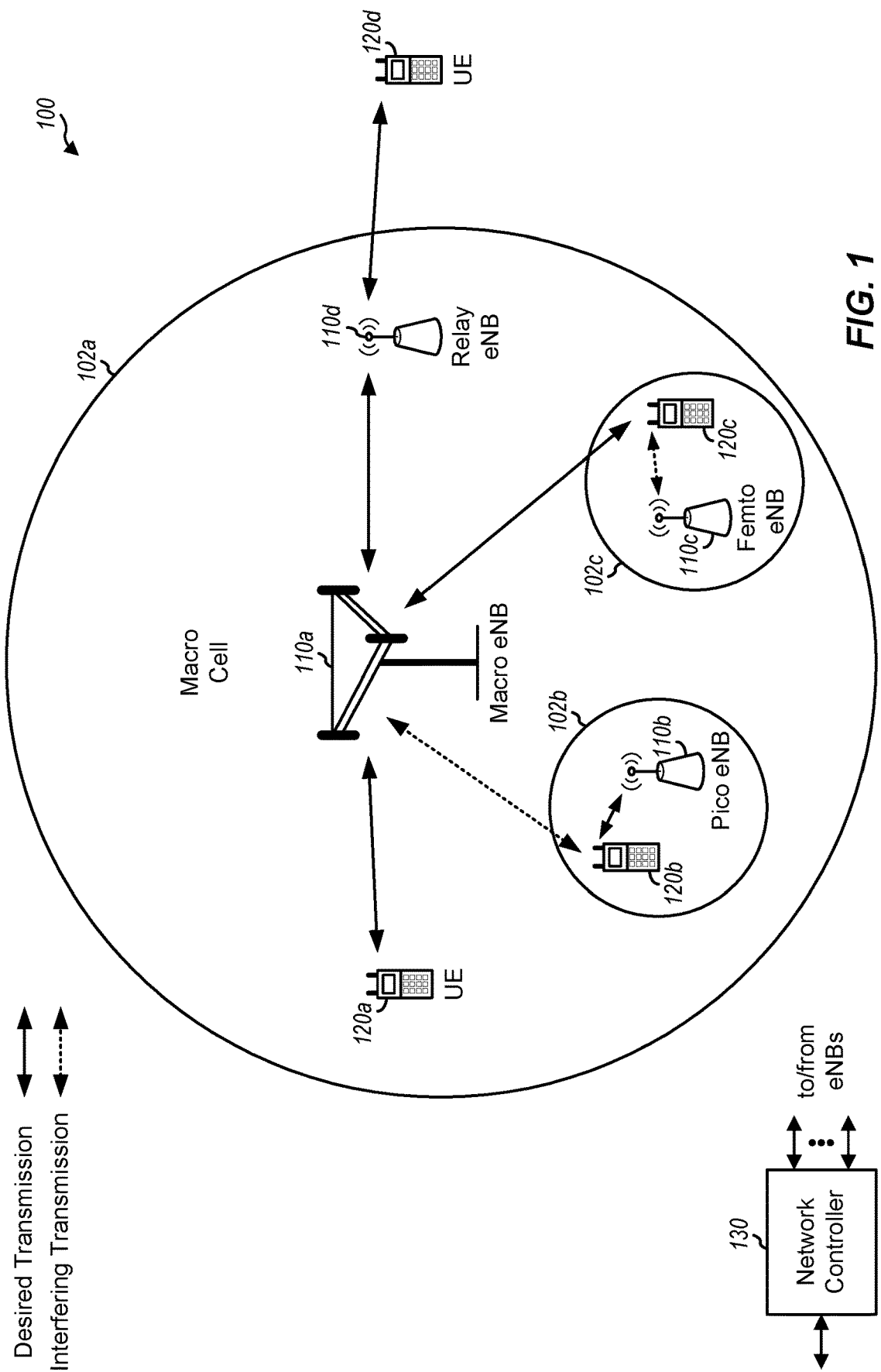
FIG. 1 is a block diagram conceptually illustrating an example wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
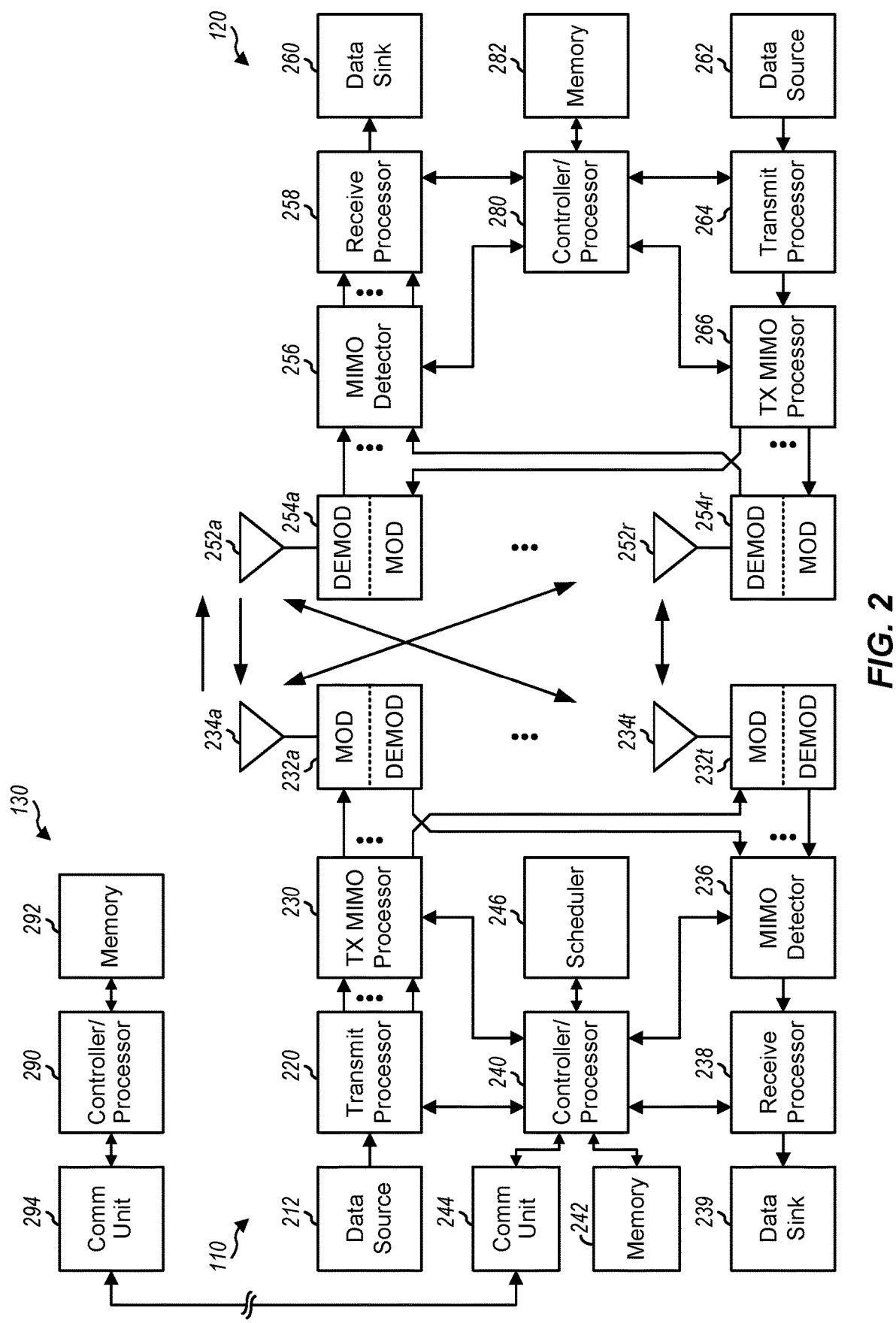
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
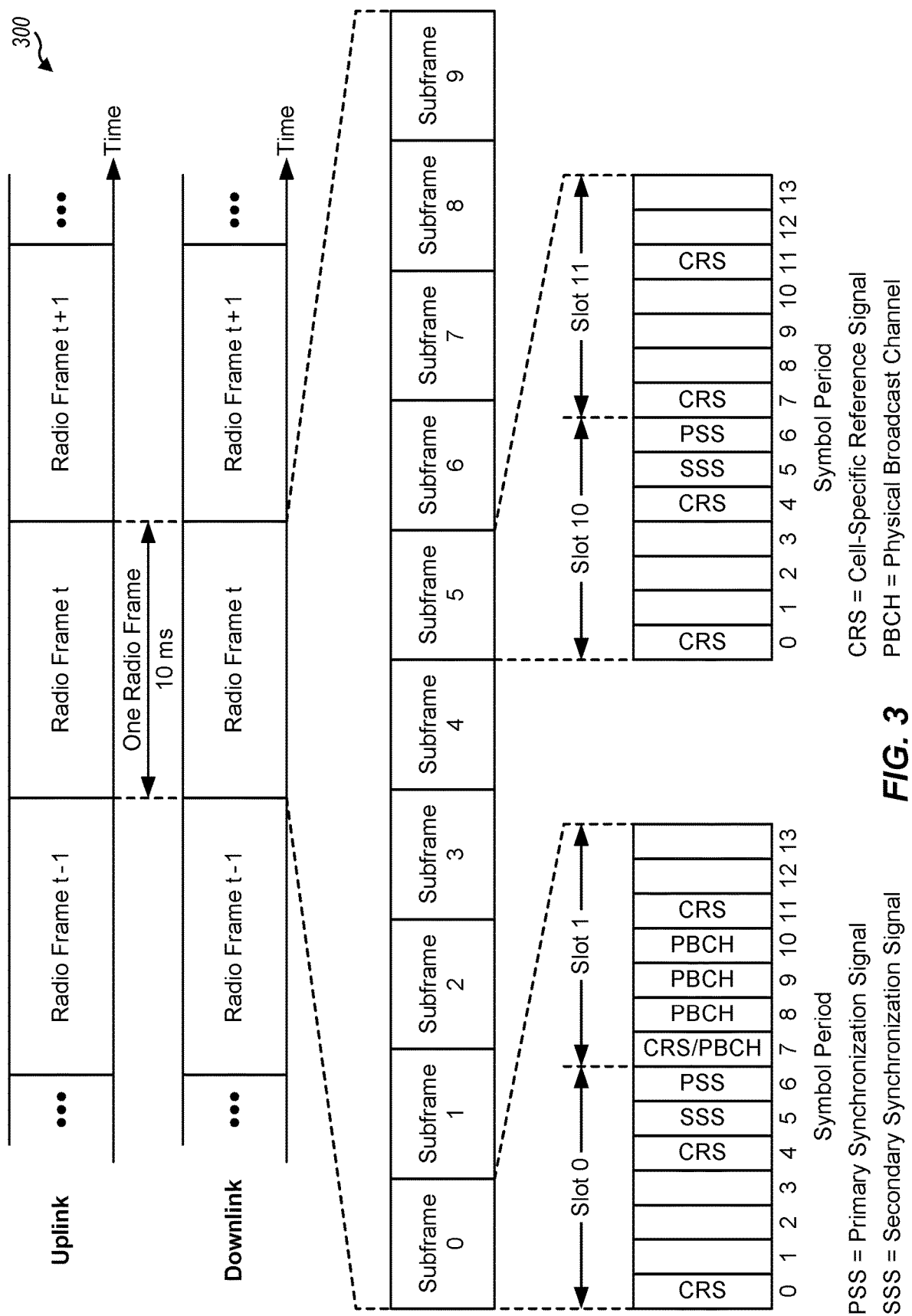
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
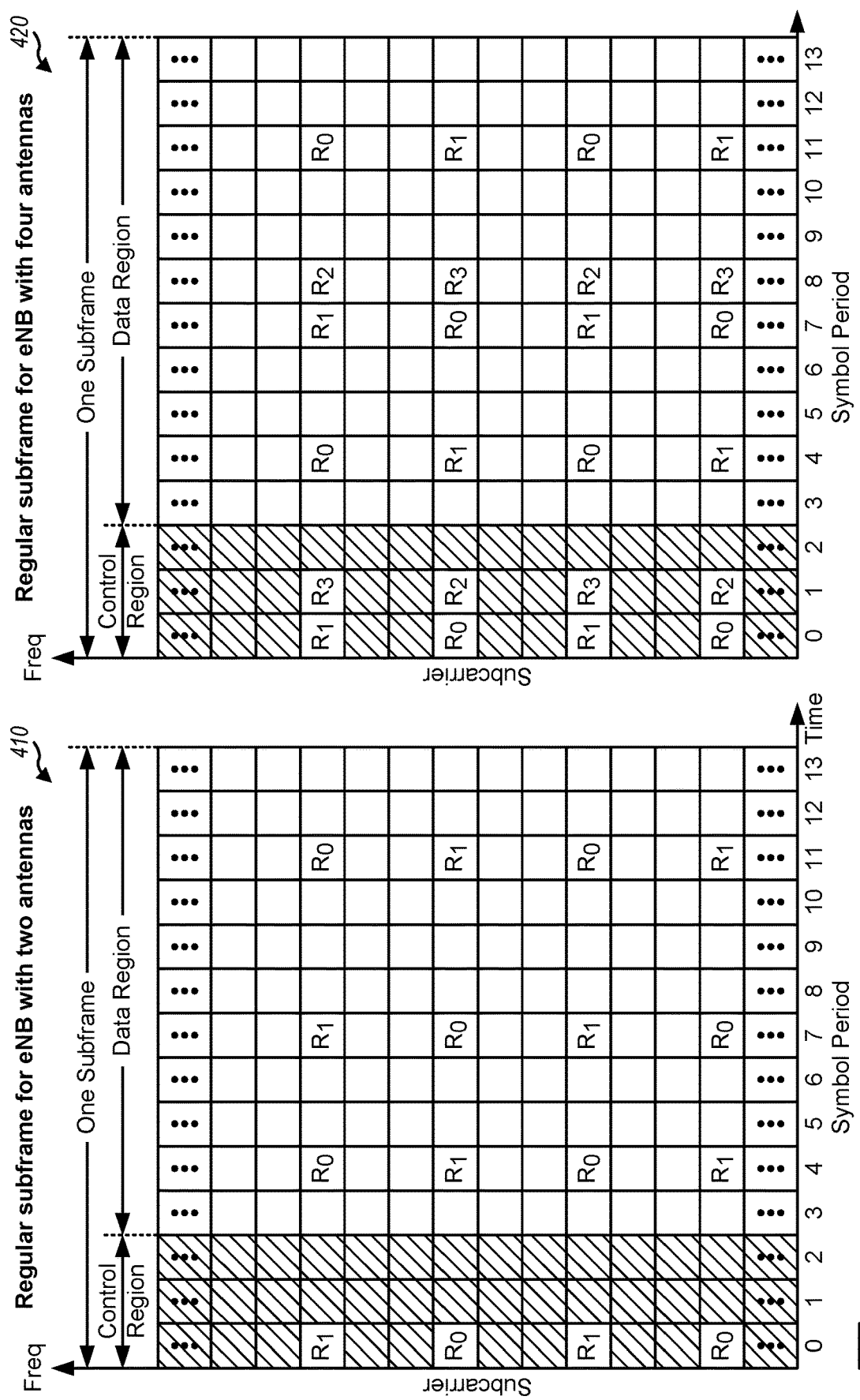
FIG. 4 illustrates an example subframe format for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Example Physical Uplink Control Channel (PUCCH) Configuration

Certain aspects of the present disclosure provide for downlink coverage enhancements for certain types of UEs (e.g., UEs operating in enhanced coverage, such as MTC UEs). These coverage enhancements may allow UEs operating in enhanced coverage to identify narrowbands on which the UEs can perform uplink transmissions based on downlink resources, as discussed in further detail herein.

For non-machine type communication (MTC) UEs, physical uplink control channel (PUCCH) resources may be frequency hopped per slot. The PUCCH may be configured, for example, with a resource block at an edge of system bandwidth in each of the two slots in a subframe. For machine type communication (MTC) UEs, however, slot-based frequency hopping for PUCCH may not provide coverage enhancements (e.g., diversity gain), for example, due to the narrowband regions within a wider system bandwidth in which MTC UEs operate. The narrowband regions in which MTC UEs operate, for example, may include a maximum of six resource blocks.

Figure 5:
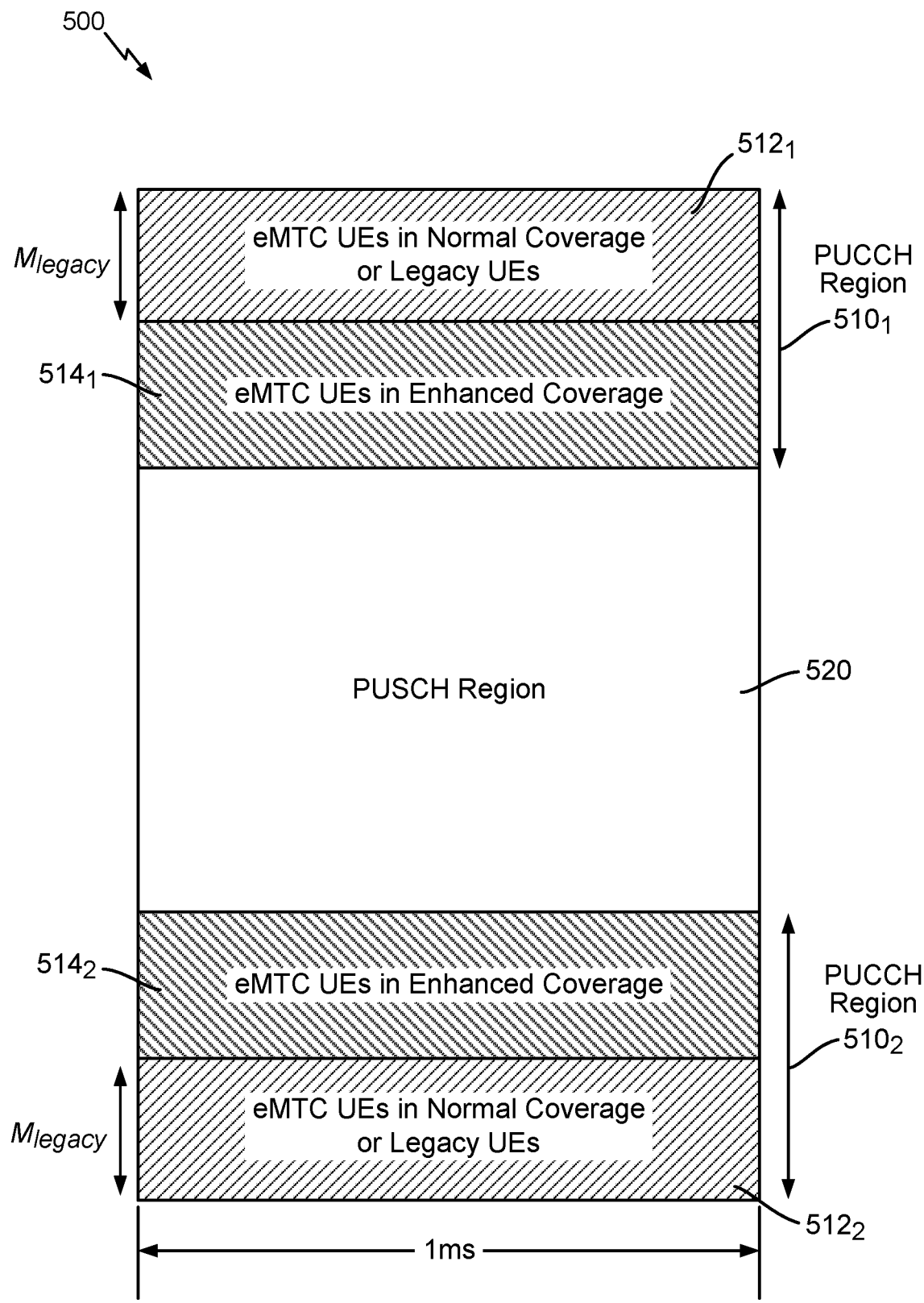
FIG. 5 illustrates an example uplink resource configuration, in accordance with certain aspects of the present disclosure.

FIG. 5 illustrates an example PUCCH configuration 500, in accordance with certain aspects of the present disclosure. As illustrated, PUCCH regions 510 may be positioned at the edges of a system bandwidth, and a physical uplink shared channel (PUSCH) region may be positioned between PUCCH regions $510_1$ and $510_2$. UEs operating in normal coverage may be scheduled in different PUCCH regions than UEs operating in enhanced coverage. For example, as illustrated, UEs operating in normal coverage (e.g., MTC UEs operating in normal coverage or legacy (non-MTC) UEs) may be scheduled in a legacy PUCCH region 512, while UEs operating in enhanced coverage may be scheduled in an enhanced coverage PUCCH region 514.

An MTC system information block (SIB) may indicate at least two PUCCH narrowband regions for MTC UEs. A location of the PUCCH narrowband regions may be determined based on a starting offset within the whole system bandwidth. The starting offset may be communicated to a UE, for example, in radio resource control (RRC) signaling, and a starting offset can be defined on for each enhanced coverage level or each narrowband. In some cases, the physical resource blocks (PRBs) for PUCCH resources for UEs operating in enhanced coverage (e.g., MTC UEs) may be configured separately from PRBs for PUCCH resources for UEs operating in normal coverage (e.g., legacy (non-MTC) UEs). In some cases, PUCCH resources may be multiplexed in the same PRB for UEs operating in enhanced coverage and legacy UEs operating in normal coverage.

For UEs operating in enhanced coverage (e.g., MTC UEs), repetition of the PUCCH may be supported. Additionally, frequency hopping may be supported for PUCCH repetition using various frequency hopping patterns. For UEs operating in a narrowband region, PUCCH may be configured based on relationships between downlink subbands to uplink regions.

Figure 6:
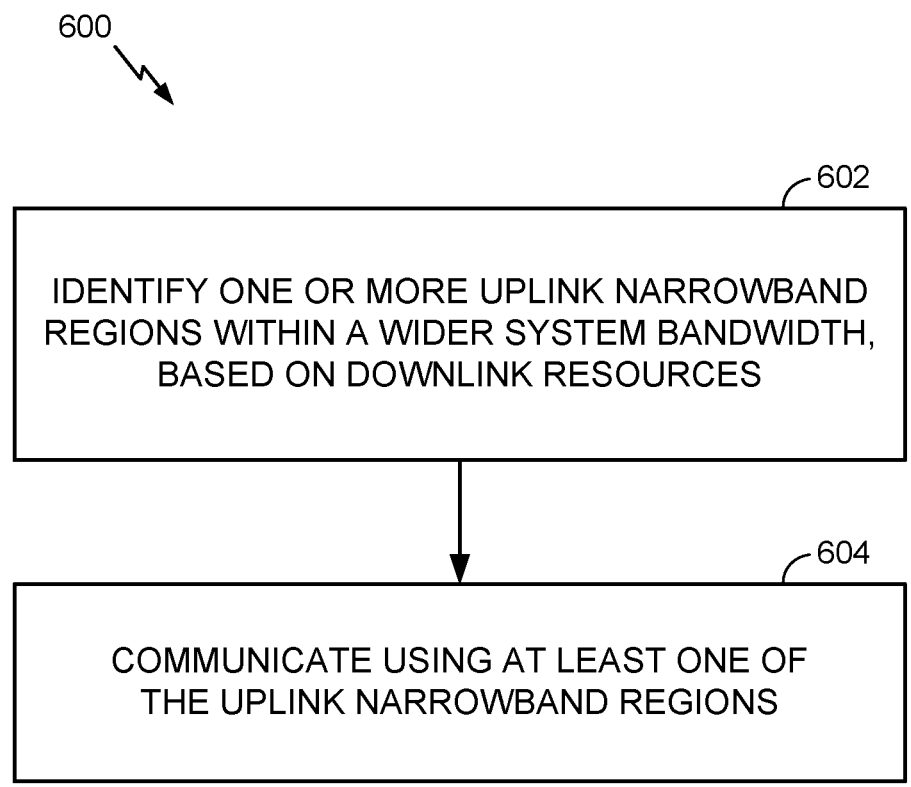
FIG. 6 illustrates example operations for determining uplink resources, in accordance with certain aspects of the present disclosure.

FIG. 6 illustrates operations 600 that may be performed to determine uplink regions based on downlink resources, in accordance with certain aspects of the present disclosure. The operations 600 may be performed, for example, by a UE (e.g., to determine what uplink resources to transmit on) or by an eNB (e.g., to determine what resources to monitor for uplink transmissions).

Operations 600 may begin at 602, where a device identifies one or more uplink narrowband regions within a wider system bandwidth, based on downlink resources. At 604, the device communicates using at least one of the identified narrowband regions.

In some cases, a device may determine uplink resources using a mapping of downlink resources, such as different downlink subbands, to PUCCH regions. For example, the mapping may be based on a cyclic shift. In an example, assuming an assigmnent of six downlink subbands, each having six resource blocks, a total of 36 downlink subbands may be mapped to one of six resource blocks in a PUCCH region using different cyclic shifts.

Figure 7:
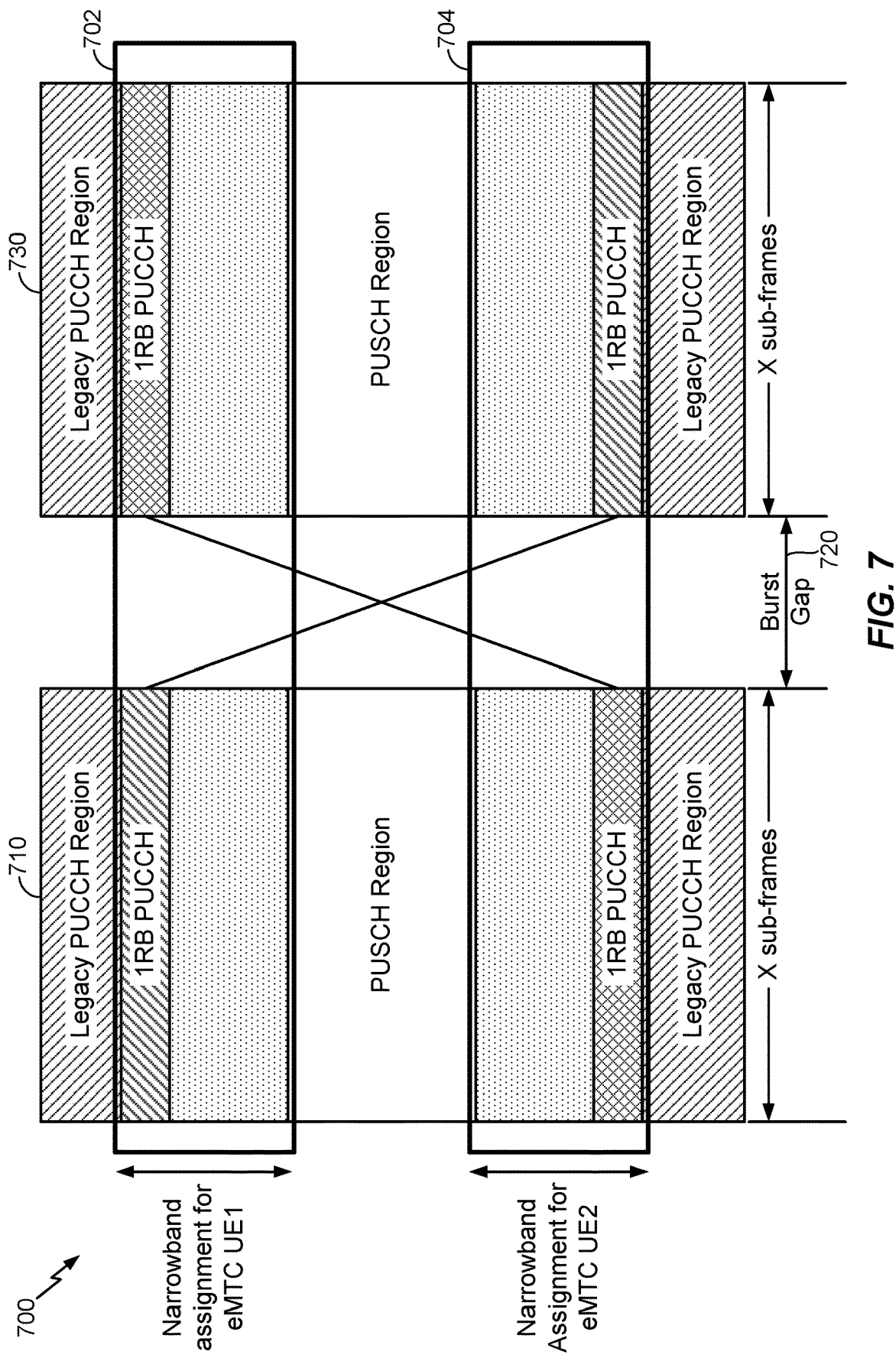
FIG. 7 illustrates an example of frequency hopped uplink resources determined for machine type communication (MTC) UEs, in accordance with certain aspects of the present disclosure.

FIG. 7 illustrates an example of frequency hopped PUCCH regions 700, in accordance with certain aspects of the present disclosure. As illustrated, a frequency hopping pattern may include fixing the frequency location of a PUCCH for a consecutive number of subframes. For example, in burst 710, a first UE may be assigned a first narrowband region 702, and a second UE may be assigned a second narrowband region 704. After burst gap 720, the frequency location of the PUCCH may hop frequencies for burst 730. As illustrated, the first UE may hop from first narrowband region 702 to second narrowband region 704, and the second UE may hop from second narrowband region 704 to first narrowband region 702 for the duration of burst 730.

In some cases, frequency hopping may entail mirroring a PUCCH region. For example, a frequency hopping pattern may result in mirroring narrowband regions at edges of the system bandwidth. The PUCCH region may be fixed at one edge of the system bandwidth for a first set of subframes a first burst duration). After a burst gap, the PUCCH region may be mirrored by moving the PUCCH region to the opposite edge of the system bandwidth for a second set of subframes (a second burst duration). Frequency hopping may be performed between at least two PUCCH narrowband regions. For MTC-type UEs operating in enhanced coverage, the location of the narrowband region used for PUCCH may remain the same for a number of subframes.

In some cases, such as where the system bandwidth exceeds a number of resource blocks (e.g., a narrowband comprising a maximum of six RBs), slot based frequency hopping within a narrowband and within a subframe may not be performed for UEs operating in enhanced coverage. For UEs operating in enhanced coverage for PUCCH, slot-level hopping across narrowbands may not be supported.

In some cases, a device may determine uplink resources based on an index of the first control channel element (CCE) of a downlink message. The downlink message may be, for example, an MTC PDCCH (MPDCCH) message. A device may determine the PUCCH index, in some cases, based on a function of the index of the first CCE index plus the number of PUCCH RBs assigned for legacy UEs (e.g., UEs operating in normal coverage). That is, the PUCCH RB index for a narrowband region may be represented as: $i=f(CCE_{index})+M_{legacy}$.

Figure 8:
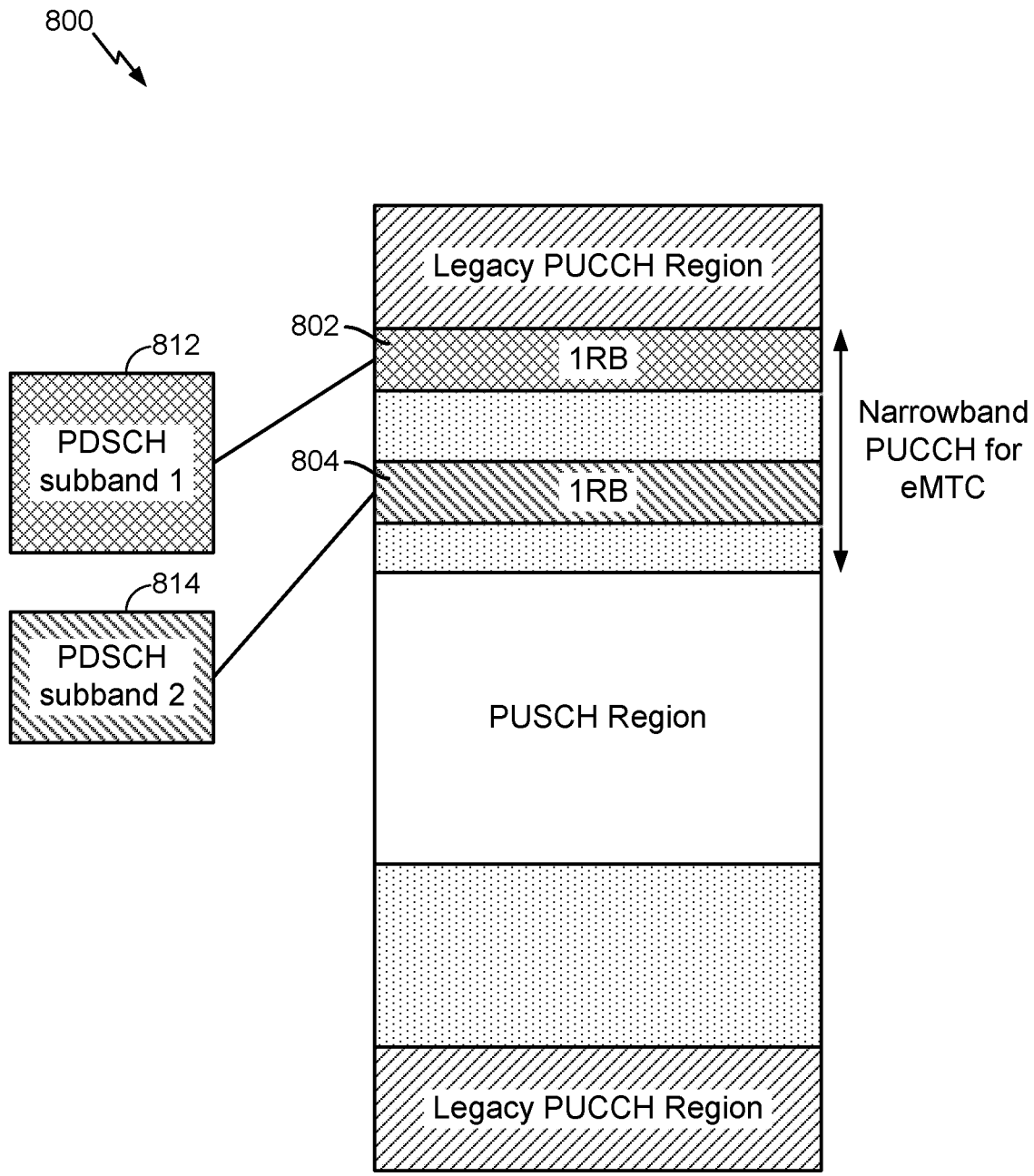
FIG. 8 illustrates an example of uplink resources determined for MTC UEs, in accordance with certain aspects of the present disclosure.

FIG. 8 illustrates an example determination 800 of uplink resources based on an index of a CCE of a downlink message, in accordance with certain aspects of the present disclosure. As illustrated, a first PUCCH region 802 in the narrowband region may be determined based on the first CCE index of a message received on a first subband 812. A second PUCCH region 804 may be determined based on the second CCE index of a message received on a second subband 814.

In some cases, subframe bundling on PUCCH may include disabling intra-subframe frequency mirroring for MTC UEs. As discussed above, the frequency location of a PUCCH used by an MTC UE may be fixed for a consecutive number of subframes. In some cases, the MTC UE may be configured to transmit feedback related to less-probable events to save power. For example, if a UE is in enhanced coverage, and an eNB uses a bundle size associated with a target block level error rate (BLER), the UE may have a low probability of transmitting a negative acknowledgment (NACK) for the bundle (e.g., errors in receiving data from the eNB may not occur often). To save power, the UE may be configured to transmit a NACK message, but need not transmit an acknowledgment (ACK) message, to the eNB in relation to a received bundle of packets.

In some cases, the frequency location of a PUCCH region may be switched after a number of consecutive subframes. The frequency location may be switched, for example, after a number of subframes larger than the size of the bundle burst and a retuning time.

In some cases, legacy UEs may be scheduled in a different PUCCH region than MTC UEs operating in enhanced coverage. Since UEs operating in normal coverage still perform slot-based frequency hopping, they can cause interference to MTC UEs. Scheduling UEs operating in normal coverage and MTC UEs operating in enhanced coverage in different PUCCH regions may avoid interference between UEs operating in normal coverage and enhanced coverage.

Additionally, frequency diversity gains may be realized by performing frequency hopping at the edges of system bandwidth, and using control regions at the edges of system bandwidth may maximize an achievable PUSCH data rate through a contiguous resource allocation on the uplink.

Figure 9:
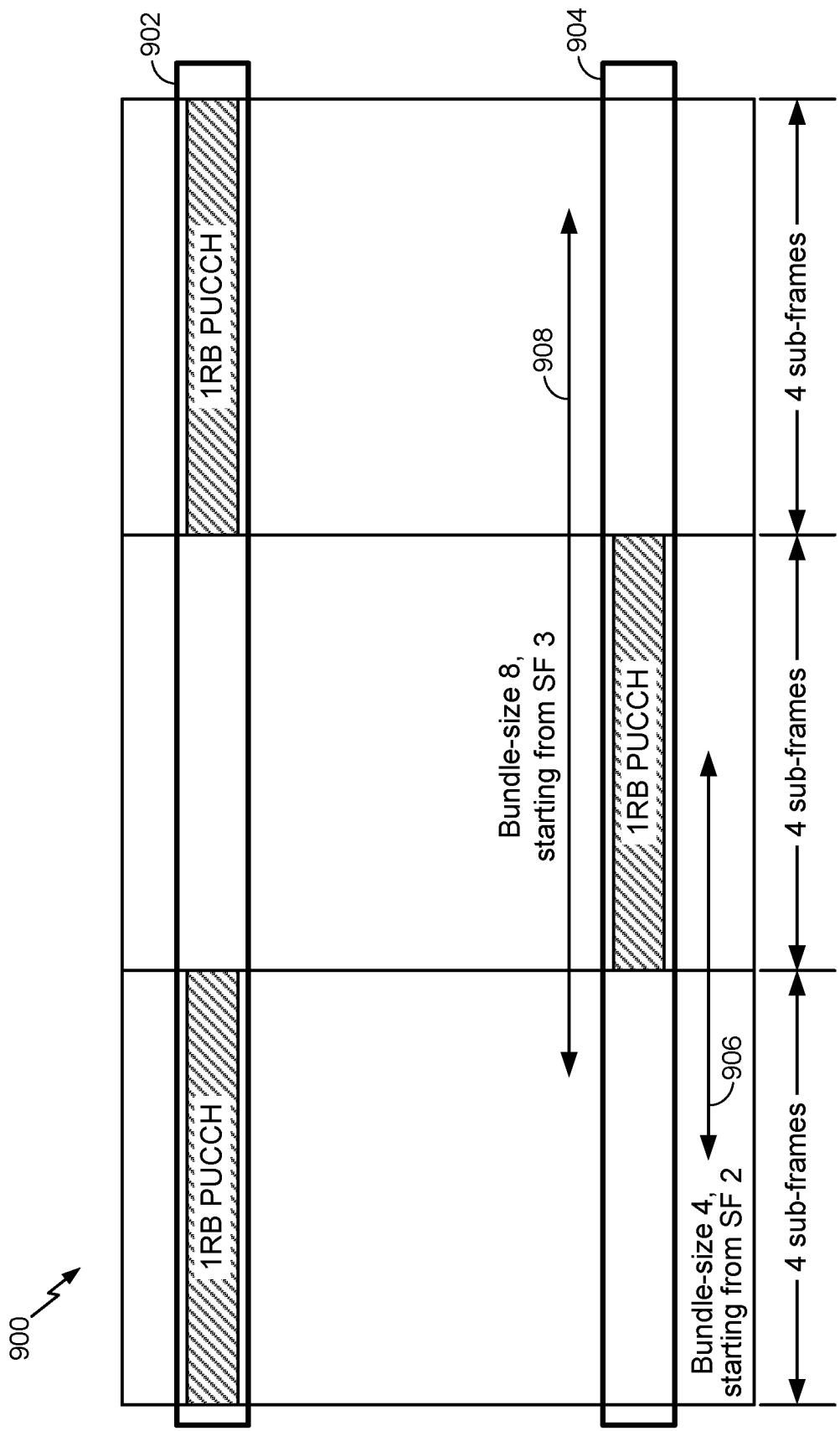
FIG. 9 illustrates an example of frequency hopped uplink transmissions across groups of subframes, in accordance with certain aspects of the present disclosure.

FIG. 9 illustrates an example frequency hopping scheme 900 that may be independent of bundle size, in accordance with certain aspects. Resource allocation with a particular subframe need not depend on a bundle size. For example, if frequency hopping is performed based on a specified frequency hopping pattern, a UE may know, for a given subframe, the channel to use for transmitting on PUCCH regardless of a bundling size. The bundle size, which may represent a number of times a PUCCH transmission is repeated, may be signaled, for example, as a radio resource control (RRC) parameter based on an enhanced coverage mode in which MTC UE is operating. In a first enhanced coverage mode, a bundle size may accommodate 1, 2, 4, or 8 PUCCH repetitions, and in a second enhanced coverage mode, a bundle size may accommodate 4, 8, 16, or 32 repetitions. The PUCCH resources may remain the same within each subframe of a PUCCH repetition and, as discussed below, may change at a subframe boundary according to a frequency hopping pattern.

As illustrated, the frequency resources on which a PUCCH may be transmitted may hop between a first frequency band 902 and a second frequency band 904 periodically (e.g., every 4 subframes in this illustration). A bundle 906 of four subframes may begin transmission in subframe 2 of the first set of four subframes. The UE may transmit the first two subframes of the bundle in the PUCCH region corresponding to the first set of subframes (e.g., transmit the first two subframes of the bundle on first frequency band 902) and the last two subframes in the PUCCH region corresponding to the second set of subframes (e.g., transmit the last two subframes of the bundle on second frequency band 904). For the bundle 908 of eight subframes beginning transmission in subframe 3 of the first set, one subframe may be transmitted in the PUCCH region corresponding to the first set of subframes (e.g., transmitted on first frequency band 902), four subframes may be transmitted in the PUCCH region corresponding to the second set of subframes (e.g., transmitted on second frequency band 904), and the remaining three subframes may be transmitted in the PUCCH region corresponding to the third set of subframes (e.g., transmitted on first frequency band 902).

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
identifying, based on a mapping between downlink resources and uplink narrowband regions, one or more uplink narrowband regions within a wider system bandwidth, wherein the identifying comprises identifying uplink narrowband regions in different subframes according to a frequency hopping pattern, wherein the frequency hopping pattern results in the uplink narrowband regions being fixed for multiple consecutive subframes, and wherein the frequency hopping pattern comprises a pattern in which communications hop between a pair of uplink narrowband regions; and
communicating using at least one of the identified uplink narrowband regions.

2. The method of claim 1, wherein the uplink narrowband regions comprise no more than six resource blocks (RBs).

3. The method of claim 1, wherein the frequency hopping pattern results in mirroring narrowband regions at edges of the system bandwidth.

4. The method of claim 1, wherein the identifying one or more uplink narrowband regions further comprises identifying the one or more uplink narrowband regions based on an index of a first control channel element (CCE) of a downlink message.

5. An apparatus for wireless communications, comprising:
at least one processor configured to identify, based on a mapping between downlink resources and uplink narrowband regions, one or more uplink narrowband regions within a wider system bandwidth, wherein the identifying comprises identifying uplink narrowband regions in different subframes according to a frequency hopping pattern, wherein the frequency hopping pattern results in the uplink narrowband regions being fixed for multiple consecutive subframes, and wherein the frequency hopping pattern comprises a pattern in which communications hop between a pair of uplink narrowband regions;
a transceiver configured to communicate using at least one of the identified uplink narrowband regions; and
a memory coupled with the at least one processor.

6. The apparatus of claim 5, wherein the uplink narrowband regions comprise no more than six resource blocks (RBs).

7. The apparatus of claim 5, wherein the frequency hopping pattern results in mirroring narrowband regions at edges of the system bandwidth.

8. The apparatus of claim 5, wherein the identifying one or more uplink narrowband regions further comprises identifying the one or more uplink narrowband regions based on an index of a first control channel element (CCE) of a downlink message.

9. An apparatus for wireless communications, comprising:
   means for identifying, based on a mapping between downlink resources and uplink narrowband regions, one or more uplink regions within a wider system bandwidth, wherein the identifying comprises identifying uplink narrowband regions in different subframes according to a frequency hopping pattern, wherein the frequency hopping pattern results in the uplink narrowband regions being fixed for multiple consecutive subframes, and wherein the frequency hopping pattern comprises a pattern in which communications hop between a pair of uplink narrowband regions; and
   means for communicating using at least one of the identified uplink narrowband regions.

10. The apparatus of claim 9, wherein the uplink narrowband regions comprise no more than six resource blocks (RBs).

11. The apparatus of claim 9, wherein the frequency hopping pattern results in mirroring narrowband regions at edges of the system bandwidth.

12. The apparatus of claim 9, wherein the means for identifying further comprises means for identifying the one or more uplink narrowband regions based on an index of a first control channel element (CCE) of a downlink message.

13. A non-transitory computer-readable medium comprising instructions which, when executed by one or more processors, performs an operation comprising:
   identifying, based on a mapping between downlink resources and uplink narrowband regions, one or more uplink narrowband regions within a wider system bandwidth, wherein the identifying comprises identifying uplink narrowband regions in different subframes according to a frequency hopping pattern, wherein the frequency hopping pattern results in the uplink narrowband regions being fixed for multiple consecutive subframes, and wherein the frequency hopping pattern comprises a pattern in which communications hop between a pair of uplink narrowband regions; and
   communicating using at least one of the identified uplink narrowband regions.

14. The non-transitory computer-readable medium of claim 13, wherein the uplink narrowband regions comprise no more than six resource blocks (RBs).

15. The non-transitory computer-readable medium of claim 13, wherein the frequency hopping pattern results in mirroring narrowband regions at edges of the system bandwidth.

16. The non-transitory computer-readable medium of claim 13, wherein identifying one or more uplink narrowband regions further comprises identifying the one or more uplink narrowband regions based on an index of a first control channel element (CCE) of a downlink message.

* * * * *